(12) United States Patent
Lee (10) Patent No.: US 8,743,226 B2
(45) Date of Patent: Jun. 3, 2014

(54) EXPOSURE ADJUSTMENT METHOD FOR NIGHT-VISION CAMERA

(75) Inventor: Chieh-Jen Lee, New Taipei (TW)

(73) Assignee: Vivotek Inc., New Taipei (TW)

(*) Notice: Subject to any disclaimer, the term of this patent is extended or adjusted under 35 U.S.C. 154(b) by 192 days.

(21) Appl. No.: 13/330,292

(22) Filed: Dec. 19, 2011

(65) Prior Publication Data

US 2013/0076927 A1    Mar. 28, 2013

(30) Foreign Application Priority Data

Sep. 28, 2011    (TW) .............................. 100135075 A (51) Int. Cl.
*H04N 5/225* (2006.01)
*H04N 7/18* (2006.01)

(52) U.S. Cl.
USPC ...................................... 348/216.1; 348/143

(58) Field of Classification Search
USPC ........... 348/143, 208.99, 216.1, 220.1, 221.1, 348/222.1
See application file for complete search history.

(56) References Cited

U.S. PATENT DOCUMENTS

| | | | | |
|---|---|---|---|---|
| 6,067,422 A | * | 5/2000 | Tokunaga et al. | 396/157 |
| 6,067,432 A | * | 5/2000 | Huang | 399/262 |
| 2001/0002936 A1 | * | 6/2001 | Tsuji et al. | 382/170 |
| 2004/0130649 A1 | * | 7/2004 | Lee | 348/345 |
| 2006/0147087 A1 | * | 7/2006 | Goncalves et al. | 382/103 |

* cited by examiner

*Primary Examiner* — Trung Diep
(74) *Attorney, Agent, or Firm* — Maschoff Brennan (57) ABSTRACT

An exposure adjustment method for night-vision camera includes the following steps. A first image and a second image are shot with an infrared light source of different intensity; the shot first image and second image are divided into a plurality of image blocks, in which positions of the image blocks in the first image are respectively corresponding to those in the second image; a light reflectivity of the image blocks of the first image is compared with a light reflectivity of the image blocks of the second image, and object distances of image objects are determined; the image object having greater object distance obtains a lower light measuring weight, and the image object having smaller object distance obtains a higher light measuring weight; and an exposure parameter of image images is adjusted according to the image weights of the two images and light measuring weights of the blocks.

8 Claims, 6 Drawing Sheets

FIG. 4

EXPOSURE ADJUSTMENT METHOD FOR NIGHT-VISION CAMERA

CROSS-REFERENCE TO RELATED APPLICATIONS

This non-provisional application claims priority under 35 U.S.C. §119(a) on Patent Application No(s). 100135075 filed in Taiwan, R.O.C. on Sep. 28, 2011, the entire contents of which are hereby incorporated by reference.

BACKGROUND

1. Technical Field

The present disclosure relates to a parameter adjustment method for a camera, and more particularly, to an exposure adjustment method for a night-vision camera.

2. Related Art

Along with the popularization of monitoring devices, more and more people have monitoring devices installed to secure property safety and personal safety. In order to monitor round the clock, some manufacturers provide monitoring cameras capable of performing shooting at night. During a night-vision state, a night-vision camera may emit infrared light (IR light) invisible to human eyes, so as to irradiate an object to be shot. The IR light is reflected by the object, and enters a lens to be imaged. At this point, an imaged formed by the reflected IR light, instead of an image formed by reflected visible light, is viewed, and therefore, the image invisible to the naked eyes in a dark environment can be shot.

The night-vision camera in the prior art performs the shooting by determining an exposure parameter with a fixed light measuring manner (for example, average light measuring, center light measuring, or spot light measuring). When the shot object is close to the camera, the image of the shot object may have blur details due to too long exposure time. When the shot object is far from the camera, the too long exposure time may also cause a blur image in addition to adding noises in the image.

SUMMARY

In view of the above, the present disclosure is an exposure adjustment method for night-vision camera, which is used for adjusting a light measuring weight to an image object in a dynamic image, so that the image object is neither overexposed nor underexposed.

The present disclosure provides an exposure adjustment method for night-vision camera, which comprises the following steps. A first image and a second image are shot respectively before and after adjusting an intensity value of an infrared light source. The shot first image and second image are divided into a plurality of image blocks, and positions of the image blocks in the first image are respectively corresponding to positions of the image blocks in the second image. A light reflectivity of the image blocks in the first image is compared with a light reflectivity of the image blocks in the second image, so as to determine object distances of image objects in the image blocks. When the object distance between the image object and the night-vision camera is large, the light measuring weight of the image block is adjusted to be lower; in contrast, when the object distance between the image object and the night-vision camera is small, the light measuring weight of the image block is adjusted to be higher. The night-vision camera shoots the image object according to the adjusted light measuring weights.

The exposure adjustment method for night-vision camera according to the present disclosure may determine the light measuring weight of each image block in the dynamic image again and calculate an exposure parameter of the dynamic image, thereby preventing abnormal exposure when the image object is too far from/close to the night-vision camera.

For purposes of summarizing, some aspects, advantages and features of some embodiments of the invention have been described in this summary. Not necessarily all of (or any of) these summarized aspects, advantages or features will be embodied in any particular embodiment of the invention. Some of these summarized aspects, advantages and features and other aspects, advantages and features may become more fully apparent from the following detailed description and the appended claims.

BRIEF DESCRIPTION OF THE DRAWINGS

The present disclosure will become more fully understood from the detailed description given herein below for illustration only, and thus are not limitative of the present disclosure, and wherein.

DETAILED DESCRIPTION

Figure 1:
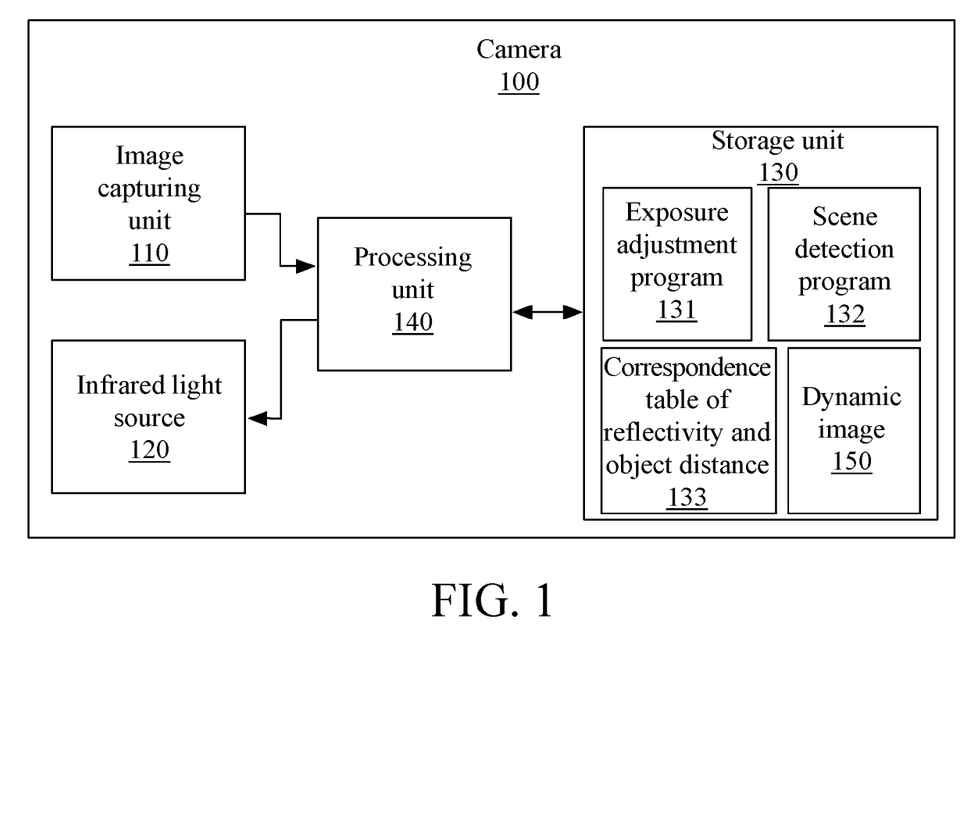
FIG. 1 is a schematic view of architecture of the present disclosure.

The present disclosure is applicable to camera devices having a night-vision function, such as, video cameras, monitors, cameras, IP-cameras, or web cameras. Referring to FIG. 1, a schematic view of architecture of the present disclosure is shown. A camera 100 of the present disclosure at least comprises an image capturing unit 110, an infrared light source 120, a storage unit 130, and a processing unit 140.

The processing unit 140 is electrically connected to the image capturing unit 110, the infrared light source 120, and the storage unit 130. The image capturing unit 110 converts received optical signals into electronic signals. The processing unit 140 performs related exposure processing (detailed operation may be obtained with reference to later description) on an image object according to the converted electronic signals. The infrared light source 120 is used for providing IR light for night-vision camera. The storage unit 130 stores an exposure adjustment program 131, a scene detection program 132, a correspondence table of reflectivity and object distance 133, and a dynamic image 150.

In order to clearly illustrate the meanings represented by images captured in different operation stages, the meanings are illustrated one by one herein. First, a range shot by the camera 100 is defined as a scene. As for the camera 100 for monitoring, the scenes shot by the camera 100 for monitoring are mostly in a fixed range. The dynamic image 150 shot by the camera 100 is composed of a plurality of frames. In the present disclosure, a shot object entering the scene is defined as an image object 160. For example, when a person enters the scene shot by the camera 100, the entering person is considered as the image object 160. Generally speaking, the processing unit 140 will not record all the dynamic images 150 in the storage unit 130. Only when the object in the scene has severe change or the image object 160 enters the scene, the camera 100 for monitoring starts to record the later dynamic image 150 and the image object 160. In this way, not only the operation load of the processing unit 140 is reduced, but also the utilization of the storage unit 130 is increased.

Figure 2A:
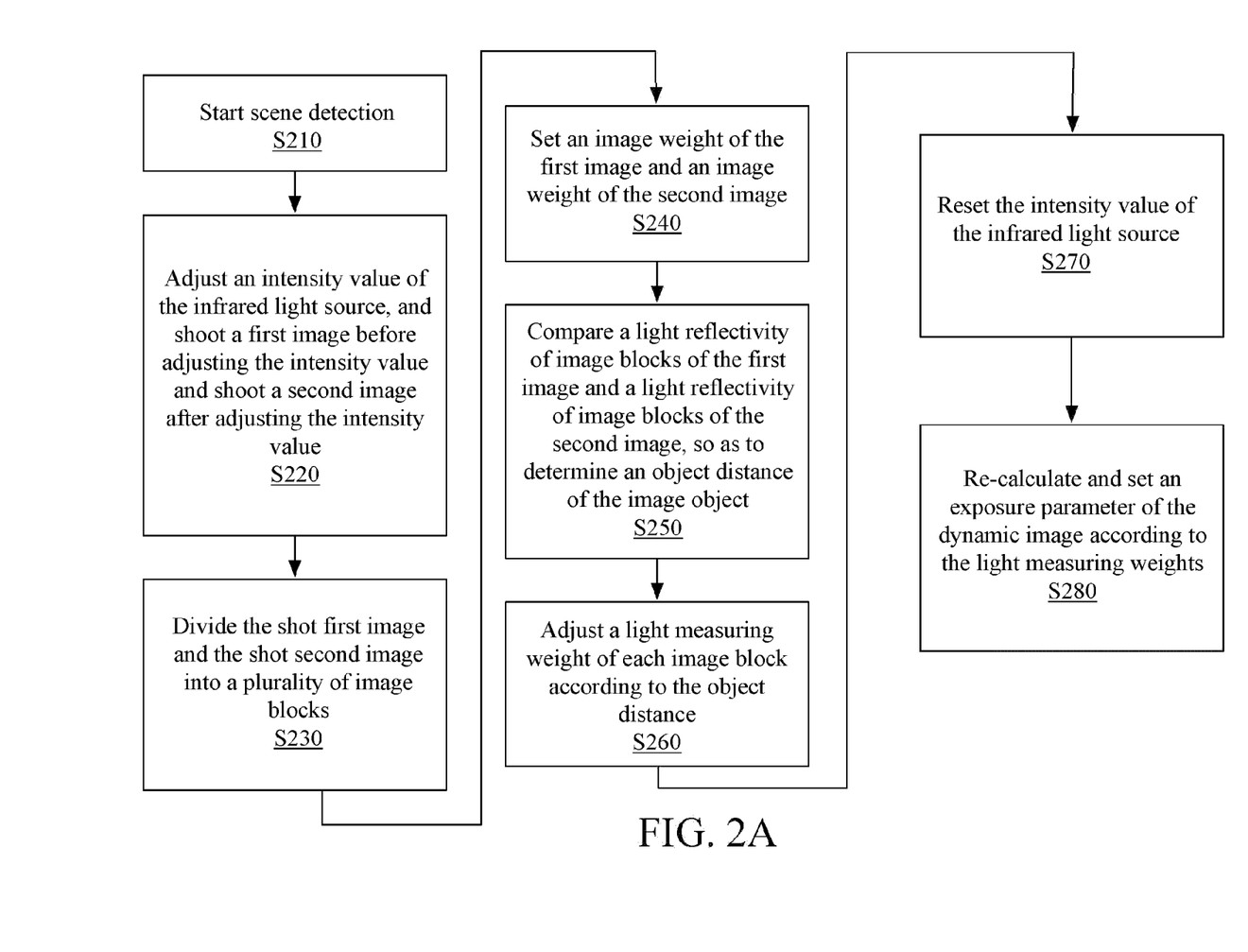
FIG. 2A is a schematic flow chart of the present disclosure.
Figure 2B:
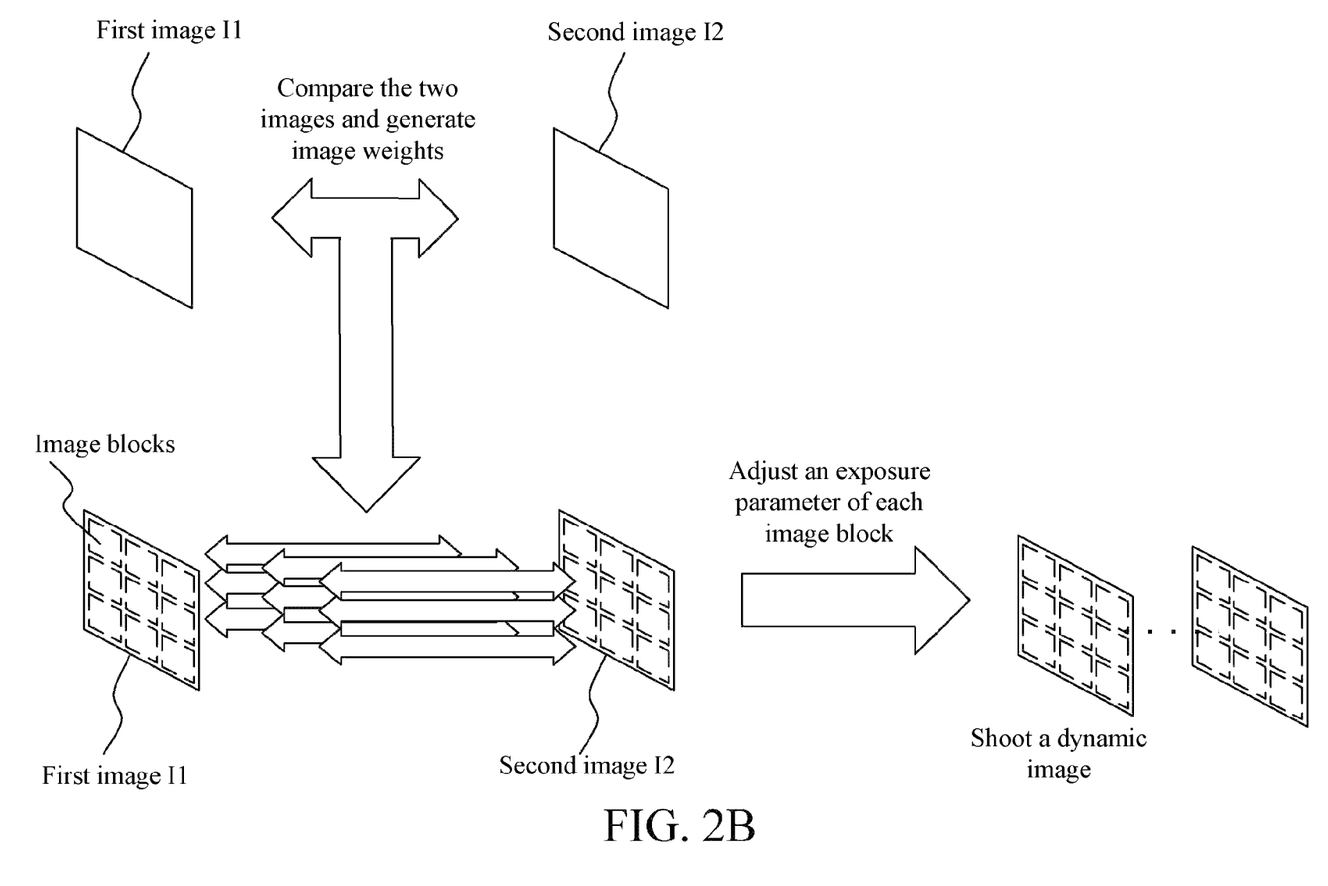
FIG. 2B is a schematic view of operation of the present disclosure.

When a new image object 160 enters the scene, a distance between the image object 160 and the camera 100 is not fixed. When the camera 100 shoots different image objects 160 with a preset exposure parameter (an exposure value and a gain value), the shot image objects 160 may be overexposed or underexposed. Therefore, the processing unit 140 of the present disclosure performs adjustment on the intensity value of the infrared light source 120 according to the following manners. Referring to FIG. 2A and FIG. 2B, a schematic flow chart and a schematic operation view of the present disclosure are shown respectively. The flow of the exposure adjustment program 131 comprises the following steps:

Step S210: Start scene detection, and determine whether a state of an image object in a dynamic image is changed according to brightness change of the shot dynamic image;

Step S220: Adjust an intensity value of the infrared light source, and shoot a first image before adjusting the intensity value and shoot a second image after adjusting the intensity value;

Step S230: Divide the shot first image and the shot second image into a plurality of image blocks;

Step S240: Set an image weight of the first image and an image weight of the second image;

Step S250: Compare a light reflectivity of image blocks of the first image and a light reflectivity of image blocks of the second image, so as to determine an object distance of the image object;

Step S260: Adjust a light measuring weight of each image block according to the object distance;

Step S270: Reset the intensity value of the infrared light source; and

Step S280: Re-calculate and set an exposure parameter of the dynamic image according to the light measuring weights, and shoot the dynamic image.

During the operation of the camera 100 of the present disclosure, the processing unit 140 also executes the scene detection program 132. The camera 100 shoots the same scene fixedly, so the brightness change rate of the scene should be maintained in a fixed range. When the brightness of the dynamic image 150 changes abnormally, a new image object 160 may enter the scene. At the same time, the processing unit 140 drives the infrared light source 120 to shoot a first image I1 and a second image I2 with IR light of different intensity values. For example, the processing unit 140 sets the infrared light source 120 to output with 100% intensity value, and shoots the first image I1. The processing unit 140 then adjusts the infrared light source 120 to output with 60% intensity value, and shoots the second image I2.

The processing unit 140 assigns different image weights to the first image I1 and the second image I2. The setting of the image weights depends on the intensity value of the infrared light source 120. For the first image I1 of stronger IR light, the processing unit 140 sets a lower image weight. On the contrary, for the second image I2 of weaker IR light, the processing unit 140 sets a higher image weight. When a union process is performed on the first image I1 and the second image I2, the overexposure effect caused by shooting the image object 160 with the IR of high intensity value may be reduced.

Figure 3A:
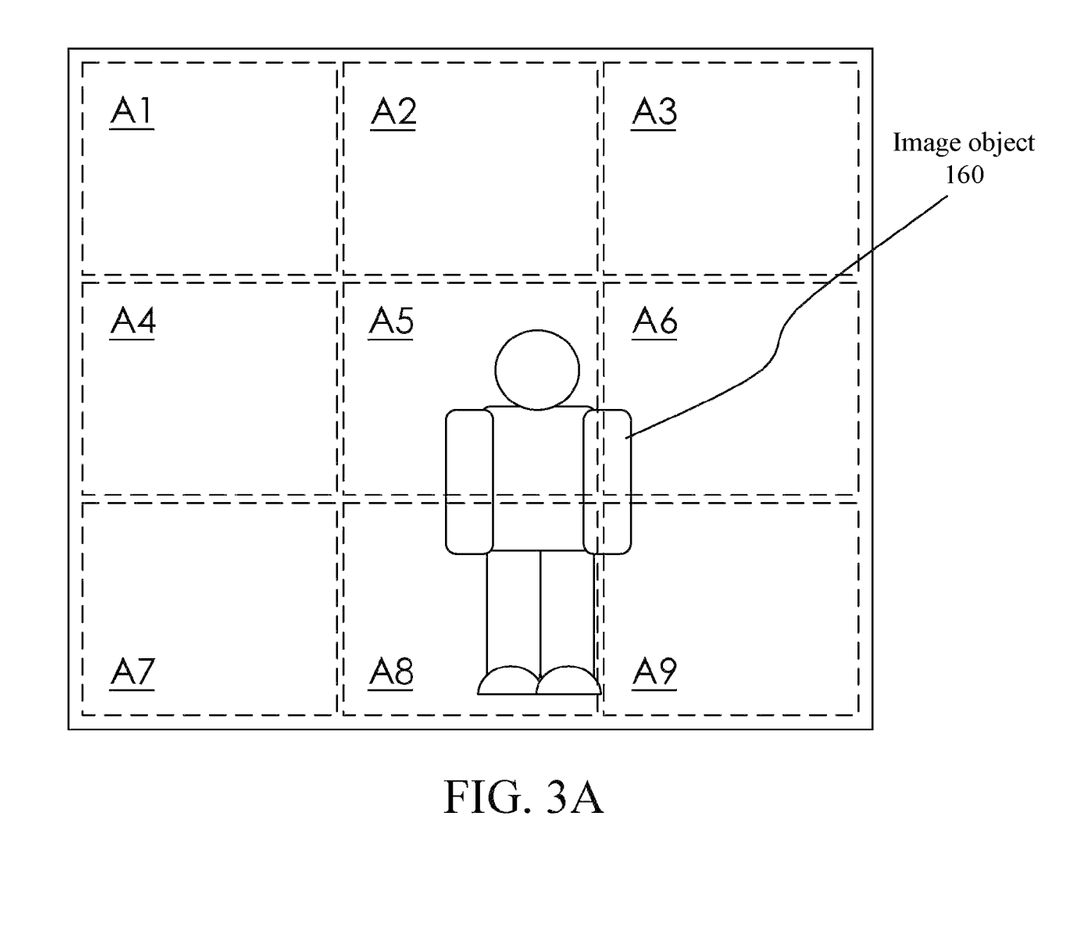
FIG. 3A is a schematic view of image blocks of the present disclosure.

The dynamic images 150 are input sequentially in series, an interval between the first image I1 and the second image I2 is rather short. Therefore, the amount of movement of the image object 160 in the first image I1 and the second image I2 may be ignored. The processing unit 140 divides the first image I1 and the second image I2 into a plurality of image blocks, and the number of the image blocks may be determined according to the operation capability of the processing unit 140, the size of the shot image, or the size of the image object 160. The number of the image blocks of the first image I1 is consistent with the number of the image blocks of the second image I2. In the present disclosure, the sequence of the steps such as dividing the image blocks, shooting the image and setting the image weight may be exchanged, and the present disclosure is not limited thereto. In addition, for ease of illustration, the shot image is divided into nine image blocks, referring to FIG. 3A. FIG. 3A is a schematic view of image blocks of the present disclosure. In FIG. 3A, the image is represented by a black line frame, and the image blocks are represented by black dashed lines. In FIG. 3A, for clarity, a display range of the image is slightly larger than all of the image blocks. The nine image blocks are respectively a first image block $A_1$, a second image block $A_2$, a third image block $A_3$, a fourth image block $A_4$, a fifth image block $A_5$, a sixth image block $A_6$, a seventh image block $A_7$, an eighth image block $A_8$, and a ninth image block $A_9$. The image blocks are arranged in an order from top to bottom and from left to right.

Figure 3B:
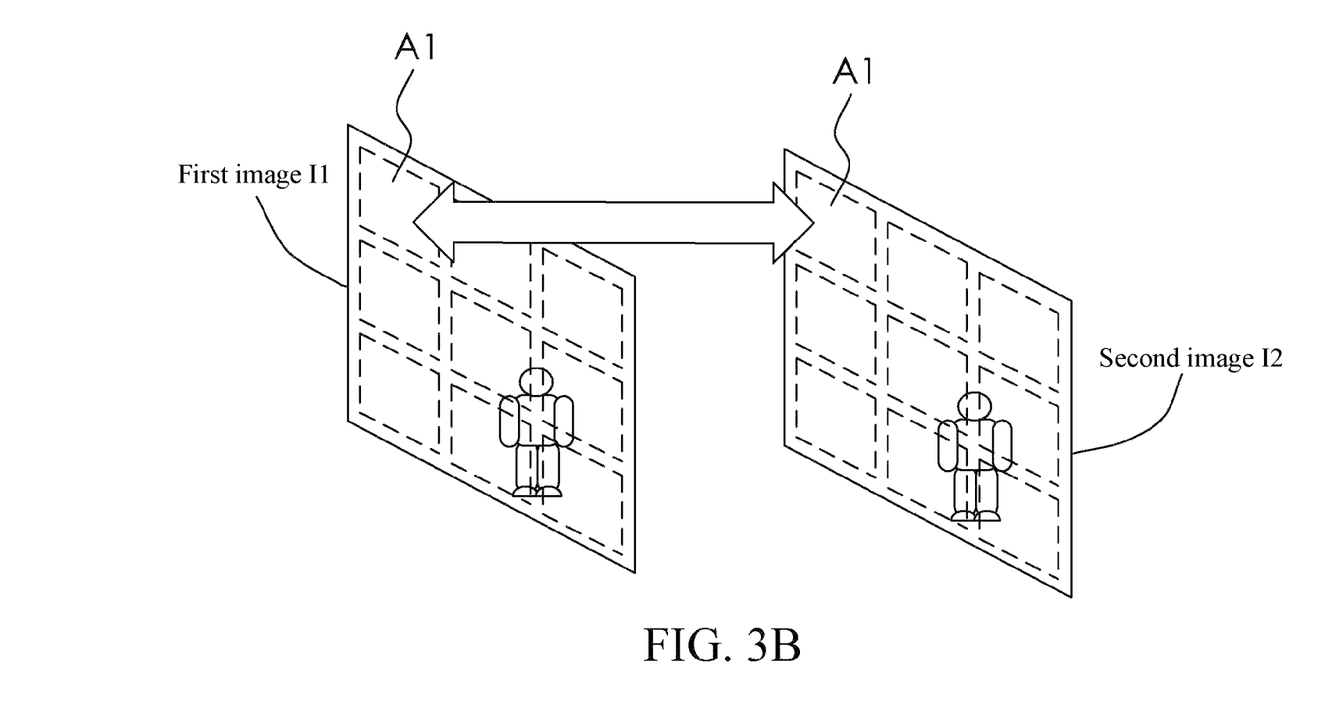
FIG. 3B is a corresponding schematic view of image blocks of the present disclosure.

According to the above manner, the processing unit 140 divides the first image I1 and the second image I2 respectively into nine image blocks, positions of each image block of different images are corresponding to each other. In other words, the first image block $A_1$ of the first image I1 is corresponding to the first image block $A_1$ of the second image I2, and other image blocks are also corresponding to each other, referring to FIG. 3B. As described above, the interval between the first image I1 and the second image I2 is very short, so the amount of movement of the image object 160 in the two images may be ignored. Therefore, pictures of the first image I1 and the second image I2 may be considered to be the same.

For the image object 160 in the same position, the light reflectivity obtained after being irradiated by the IR light of different intensity values may be different. Therefore, the processing unit 140 may look up the correspondence table of reflectivity and object distance 133 to obtain the object distance between the image object 160 and the camera 100 according to the light reflectivity change of the image object 160 in the first image I1 and the second image I2. Generally speaking, in the same object distance, the light reflectivity of the image object 160 changes along with the change of the intensity of irradiation light. When the intensity value of the IR light is high and the reflectivity of the image object 160 is low, it indicates that the object distance of the image object 160 is large. When the intensity value of the IR light is low and the reflectivity of the image object 160 is high, it indicates that the object distance of the image object 160 is small. Therefore, the processing unit 140 may obtain the object distance between the camera 100 and the image object 160 according to the change of the light reflectivity in the first image I1 and the second image I2.

The processing unit 140 performs an object distance process on the image blocks having the image object 160. When the image object 160 enters the scene, not all of the image blocks cover the image object 160. Therefore, the processing unit 140 may perform the object distance calculation on the image blocks having the image object 160. After the processing unit 140 obtains the object distance of the image object 160 in the image blocks, the processing unit 140 adjusts a light measuring weight on the corresponding image blocks according to the object distance. For the same image, when the image blocks have high reflectivity, the processing unit 140 sets a higher light measuring weight for the image blocks. When the image blocks have low reflectivity, the processing unit 140 sets a lower light measuring weight for the image blocks.

Then, the processing unit 140 fixes the intensity value of the infrared light source 120, so that the infrared light source 120 will not change to cause image jitter when shooting the dynamic image 150. After the processing unit 140 finishes the assignment of the image weights of the images and the light measuring weights of the image blocks, the processing unit 140 adjusts the exposure value and the gain value of the dynamic image again according to the image weights and the light measuring weights, and shoots the dynamic image 150. In other words, after obtaining the new exposure parameter of the dynamic image, the processing unit 140 shoots the dynamic image according to the new exposure parameter.

For example, the processing unit 140 shoots the first image I1 and the second image I2 with the IR light having different intensity values being 100% and 50% respectively. The processing unit 140 sets the image weights respectively being 50% and 100% for the first image I1 and the second image I2 according to the intensity values. Then, the processing unit 140 calculates the object distance of the image object according to the image blocks of the first image I1 and the image blocks of the second image I2. The processing unit 140 finds corresponding light reflectivity and the light measuring weight thereof according to the object distance. The processing unit 140 multiplies the light measuring weight of each image block by the image weight, so as to obtain a new light measuring weight of each weight. The processing unit 140 performs weighted average on the light measuring weight of the first image I1 and the light measuring weight of the second image I2, so as to generate a new light measuring weight. Finally, the processing unit 140 adjusts the exposure parameter according to the new light measuring weight, and shoots the dynamic image again.

Figure 4:
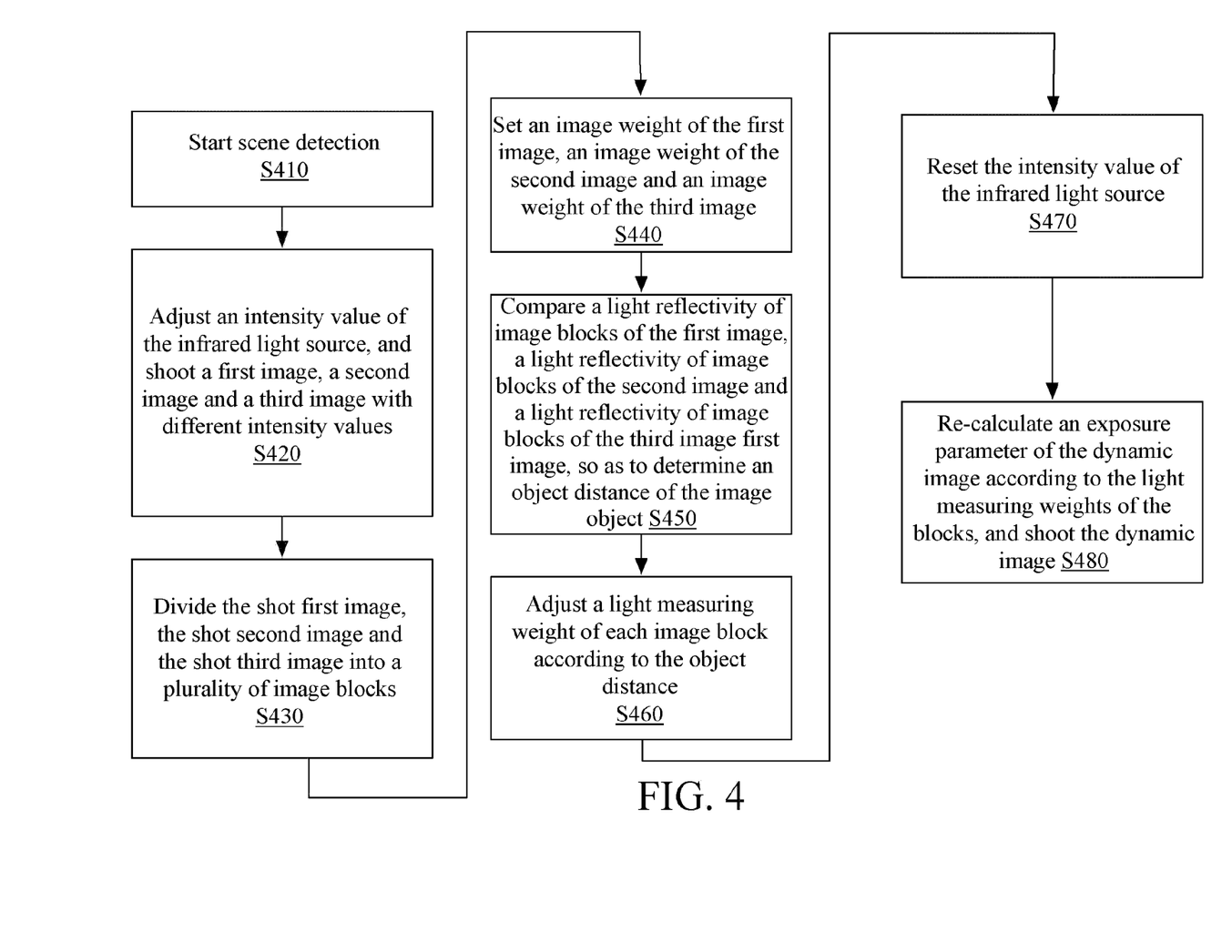
FIG. 4 is a flow chart of another implementation aspect of the present disclosure.

In addition to the above implementation aspect, the present disclosure may also compare the light reflectivity according to the plurality of shot images. Referring to FIG. 4, a flow chart of another implementation of the present disclosure is shown.

Step S410: Start scene detection, and determine whether a state of an image object 160 in a dynamic image is changed according to brightness change of the shot dynamic image;

Step S420: Adjust an intensity value of the infrared light source, and shoot a first image, a second image and a third image with different intensity values;

Step S430: Divide the shot first image, the shot second image and the shot third image into a plurality of image blocks;

Step S440: Set an image weight of the first image, an image weight of the second image and an image weight of the third image Step S450: Compare a light reflectivity of image blocks of the first image, a light reflectivity of image blocks of the second image and a light reflectivity of image blocks of the third image first image, so as to determine an object distance of the image object;

Step S460: Adjust a light measuring weight of each image block according to the object distance;

Step S470: Reset the intensity value of the infrared light source; and

Step S480: Re-calculate an exposure parameter of the dynamic image according to the light measuring weights of the blocks, and shoot the dynamic image.

In this implementation aspect, the image object 160 is irradiated by the infrared light source 120 of three different intensity values, and a first image I1, a second image I2 and a third image I3 are shot. The processing unit 140 sets the image weight of each of the images I1, I2, and I3 according to the different intensity values. Then, the processing unit 140 performs object distance recognition of the image object in the image blocks of each of the images I1, I2, and I3, and sets corresponding light measuring weights according to the object distance. Finally, the processing unit 140 adjusts the exposure parameter according to a new light measuring weight, and shoots the dynamic image again.

The exposure adjustment method for night-vision camera provided in the present disclosure may re-determine the light measuring weight of each image block of the dynamic image, and calculates the exposure parameter for subsequently camera the dynamic image, thereby preventing the abnormal exposure when the image object 160 is too far away from/close to the night-vision camera 100.

The present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

What is claimed is:

1. An exposure adjustment method for night-vision camera, used to adjust an exposure parameter of a dynamic image having an image object, the exposure adjustment method comprising:
   adjusting an intensity value of an infrared light source, and shooting a first image before adjusting the intensity value and shooting a second image after adjusting the intensity value, wherein the infrared light source is configured to cast infrared light onto the image object;
   dividing the shot first image into a plurality of first image blocks;
   dividing the shot second image into a plurality of second image blocks;
   obtaining a first light reflectivity according to the casted infrared light and the first image block;
   obtaining a second light reflectivity according to the casted infrared light and the second image block;
   comparing the first light reflectivity and the second light reflectivity, so as to determine an object distance of the image object;
   adjusting a light measuring weight of each of the first image blocks and the second image blocks according to the object distance; and
   re-calculating the exposure parameter of the dynamic image according to the light measuring weight, and shooting the dynamic image.

2. The exposure adjustment method for night-vision camera according to claim 1, before shooting the first image, further comprising:
   starting a scene detection, and determining whether a state of the image object in the dynamic image changes according to a brightness change of the shot dynamic image.

3. The exposure adjustment method for night-vision camera according to claim 1, wherein when adjusting the intensity value of the infrared light source, an exposure value and a gain value in the exposure parameter of a night-vision camera are fixed.

4. The exposure adjustment method for night-vision camera according to claim 1, after shooting the first image and the second image, further comprising: setting an image weight of the first image and an image weight of the second image.

5. The exposure adjustment method for night-vision camera according to claim 1, after shooting the first image and the second image, further comprising: shooting a third image, wherein an intensity value of the third image is different from the intensity value of the first image and the intensity value of the second image.

6. The exposure adjustment method for night-vision camera according to claim 5, after shooting the first image, the second image, and the third image, further comprising: setting an image weight of the first image, an image weight of the second image, and an image weight of the third image.

7. The exposure adjustment method for night-vision camera according to claim 5, wherein the light reflectivity of the image blocks of the first image, the light reflectivity of the image blocks of the second image, and a light reflectivity of image blocks of the third image are compared, so as to determine the object distance of the image object.

8. The exposure adjustment method for night-vision camera according to claim 1, after adjusting the light measuring weight, further comprising: resetting the intensity value of the infrared light source.

\* \* \* \* \*